US012801315B2

(12) United States Patent
Miyagi

(10) Patent No.: US 12,801,315 B2
(45) Date of Patent: Nov. 17, 2026

(54) INFORMATION PROCESSING APPARATUS HAVING CONTROLLED MEDIUM TYPE DISPLAY, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Arata Miyagi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 288 days.

(21) Appl. No.: 18/430,875

(22) Filed: Feb. 2, 2024

(65) Prior Publication Data

US 2024/0281183 A1 Aug. 22, 2024

(30) Foreign Application Priority Data

Feb. 17, 2023 (JP) ................................ 2023-023636

(51) Int. Cl.
*G06F 3/12* (2006.01)

(52) U.S. Cl.
CPC .......... *G06F 3/1205* (2013.01); *G06F 3/1232* (2013.01); *G06F 3/1254* (2013.01); *G06F 3/1285* (2013.01)

(58) Field of Classification Search
None
See application file for complete search history.

(56) References Cited

U.S. PATENT DOCUMENTS 8,122,375 B2 2/2012 Ito
10,493,784 B2 12/2019 Yamada et al.
11,383,541 B2 7/2022 Yamada et al.
11,544,025 B1 * 1/2023 Chang .................. G06F 3/1208
11,954,386 B2 * 4/2024 Hidaka ................. G06F 3/1285
2012/0099148 A1 * 4/2012 Tokura .................. G06F 3/1205 358/1.15
2013/0314740 A1 * 11/2013 Benedicto ............ G06F 3/1208 358/1.15

(Continued)

FOREIGN PATENT DOCUMENTS

JP 2006-091987 A 4/2006

*Primary Examiner* — Nicholas Pachol
(74) *Attorney, Agent, or Firm* — VENABLE LLP

(57) ABSTRACT

A control method of an information processing apparatus implemented by an application that extends a function of print data generation software stored in the information processing apparatus includes acquiring a medium type supported by a printing apparatus, identifying, based on the acquired medium type, a group to which the acquired medium type belongs, and identifying a display text corresponding to the acquired medium type. A display unit displays groups as first selectable options including the group to which the acquired medium type belongs, in accordance with selection of an object for setting a medium type of a medium to be used for printing, and in accordance with selection of the group to which the acquired medium type belongs is selected, the display unit displays medium types included in the group to which the acquired medium type belongs as second selectable options including the display text corresponding to the acquired medium type.

12 Claims, 16 Drawing Sheets

(56) References Cited

U.S. PATENT DOCUMENTS

| | | | | |
|---|---|---|---|---|
| 2014/0063517 | A1* | 3/2014 | Tachibana | G03G 15/502 358/1.12 |
| 2014/0285843 | A1* | 9/2014 | Oonami | G06F 3/1255 358/1.15 |
| 2016/0039234 | A1* | 2/2016 | Hirai | G06F 3/1257 347/5 |
| 2020/0159471 | A1* | 5/2020 | Sugai | G06F 3/1205 |
| 2021/0200488 | A1* | 7/2021 | Inoue | G06F 3/1243 |
| 2024/0010451 | A1* | 1/2024 | Sone | G06F 3/1285 |
| 2025/0036326 | A1* | 1/2025 | Nakayama | G06F 3/1207 |

* cited by examiner

FIG. 7A

701

```
Get-Printer-Attributes:
  attributes-charset = utf-8
  attributes-natural-language = ja
  printer-uri = ipp://192.168.115.10:433/ipp/print
  requested-attributes = copies-supported,document-format-supported,
  media-supported,media-type-
supported,media-source-supported,printer-strings-languages-supported
```

FIG. 7B

702

```
status-code=successful-ok
copies-supported=1-999
document-format-supported= application/ pdf,image/jpeg,image/pwg-raster
media-supported=
iso_a4_210x297mm,iso_a5_148x210mm,iso_a6_105x148mm,iso_dl_110x220mm,
na_legal_8.5x14in,na_letter_8.5x11in
media-type-supported=auto,
stationery,com.example-photo-4065A3725632BC55BE16,
com.example-photo-
4A968E30B18F997BD501,com.example-other-456FBE3760AF7F1A5D28,
envelope,com.example-other-
48EF82742EC985B29A20,com.example-other-
48BF9ACCEA9FFBADB3ED,com.example-disc-
F42FE803EFA60E6E4644E,com.example-disc-6430DBC12EAA1C83B6F61
media-source-supported=auto,main,tray-1,tray-2
printer-strings-languages-supported=
ja,en,fr,de,it,es,pt-br,nl,da,no,sv,fi,pl,cs,ru,tr,ar,zh-cn,zh-tw,ko,th,id
```

FIG. 7C

703

```
Get-Printer-Attributes:
  attributes-charset = utf-8
  attributes-natural-language = jp
  printer-uri = ipp://192.168.115.10:433/ipp/print
  requested-attributes = printer-strings-uri
```

FIG. 7D

704

```
status-code=successful-ok
printer-strings-uri=http://192.168.115.10/strings/ja.txt
```

FIG. 7E

705

```
Get-Printer-Attributes:
  attributes-charset = utf-8
  attributes-natural-language = en
  printer-uri = ipp://192.168.115.10:433/ipp/print
  requested-attributes = printer-strings-uri
```

FIG. 7F

706

```
status-code=successful-ok
printer-strings-uri=http://192.168.115.10/strings/en.txt
```

FIG. 8A

801

```
"media-type.com.example-photo-4065A3725632BC55BE16" = "光沢ゴールド";
"media-type.com.example-photo-4A968E30B18F997BD501" = "光沢プラチナ";
"media-type.com.example-photo-456FBE3760AF7F1A5D28"="マットフォト用紙";
"media-type.com.example-other-48EF82742EC985B29A20" = "アート紙";
"media-type.com.example-other-48BF9ACCEA9FFBADB3ED" = "和紙";
"media-type.com.example-disc-F42FE803EFA60E6E4644E" = "推奨ディスク";
"media-type.com.example-disc-6430DBC12EAA1C83B6F61" = "その他ディスク";
```

FIG. 8B

802

```
"media-type.com.example-photo-4065A3725632BC55BE16" = "Photo Paper Plus Glossy";
"media-type.com.example-photo-4A968E30B18F997BD501" = "Photo Paper Pro Platinum";
"media-type.com.example-photo-456FBE3760AF7F1A5D28" ="Matte Photo Paper"
"media-type.com.example-other-48EF82742EC985B29A20"  = "Fine Art Paper";
"media-type.com.example-other-48BF9ACCEA9FFBADB3ED" = "Washi";
"media-type.com.example-disc-F42FE803EFA60E6E4644E" = "Printable disc(recommended) ";
"media-type.com.example-disc-6430DBC12EAA1C83B6F61" = "Printable disc(other)";
```

FIG. 8C

803

```
add-media
  mediagroup=0
  mediaguid=B92E4A48-3B4A-435B-BB71-2E06CDDA13C5
  name="custom stationery"
  colortable="000000...."
```

FIG. 10A

1000

| GUID | media-type ATTRIBUTE | STANDARD DEFINITION | CATEGORY | JAPANESE | ENGLISH |
|---|---|---|---|---|---|
| — | auto | TRUE | — | "自動選択" | Auto select |
| 00000000-0000-0000-0000-000000000044 | stationery | TRUE | stationery | "普通紙" | Plain Paper |
| 2EAB25A2-3F42-4065-A372-5632BC55BE16 | com.example-photo-4065A3725632BC55BE16 | FALSE | photo | "光沢ゴールド" | Photo Paper Plus Glossy |
| CEACA6E7-2C18-4A96-8E30-B18F997BD501 | com.example-photo-4A968E30B18F997BD501 | FALSE | photo | "光沢プラチナ" | Photo Paper Pro Platinum |
| 56E5746B-FA71-456F-BE37-60AF7F1A5D28 | com.example-other-456FBE3760AF7F1A5D28 | FALSE | other | "マットフォト用紙" | Matte Photo Paper |
| 00000000-0000-0000-0000-000000000050 | envelope | TRUE | envelope | "封筒" | envelope |
| C46A551C-4F70-48EF-8274-2EC985B29A20 | com.example-other-48EF82742EC985B29A20 | FALSE | other | "アート紙" | Fine Art Paper |
| A8C1B2A5-C7F2-48BF-9ACC-EA9FFBADB3ED | com.example-other-48BF9ACCEA9FFBADB3ED | FALSE | other | "和紙" | Washi |
| DCA8368A-7C6F-42FE-803E-FA60E6E4644E | com.example-disc-F42FE803EFA60E6E4644E | FALSE | disc | "推奨ディスク" | Printable disc (recommended) |
| 86D685AF-9966-430D-BC12-EAA1C83B6F61 | com.example-disc-6430DBC12EAA1C83B6F61 | FALSE | disc | "その他ディスク" | Printable disc (other) |

FIG. 10B

1001

| MEDIUM GROUP | CATEGORY |
|---|---|
| 0 | stationery |
| 1 | photographic |
| 2 | envelope |
| 3 | disc |
| 4 | film |
| 5 | other |

FIG. 10C

1002

| media-type ATTRIBUTE | STANDARD DEFINITION | CATEGORY | JAPANESE | ENGLISH |
|---|---|---|---|---|
| auto | TRUE | — | "自動選択" | Auto select |
| stationery | TRUE | stationery | "普通紙" | Plain Paper |
| com.example-photo-4065A3725632BC55BE16 | FALSE | photo | "光沢ゴールド" | Photo Paper Plus Glossy |
| com.example-photo-4A968E30B18F997BD501 | FALSE | photo | "光沢プラチナ" | Photo Paper Pro Platinum |
| com.example-other-456FBE3760AF7F1A5D28 | FALSE | photo | "マットフォト用紙" | Matte Photo Paper |
| envelope | TRUE | envelope | "封筒" | envelope |
| com.example-other-48EF82742EC985B29A20 | FALSE | other | "アート紙" | Fine Art Paper |
| com.example-other-48BF9ACCEA9FFBADB3ED | FALSE | other | "和紙" | Washi |
| com.example-disc-F42FE803EFA60E6E4644E | FALSE | disc | "推奨ディスク" | Printable disc (recommended) |
| com.example-disc-6430DBC12EAA1C83B6F61 | FALSE | disc | "その他ディスク" | Printable disc (other) |

INFORMATION PROCESSING APPARATUS HAVING CONTROLLED MEDIUM TYPE DISPLAY, CONTROL METHOD, AND NON-TRANSITORY COMPUTER-READABLE STORAGE MEDIUM STORING PROGRAM

BACKGROUND OF THE INVENTION

Field of the Invention

The present invention relates to an information processing apparatus, a control method, and a non-transitory computer-readable storage medium storing a program.

Description of the Related Art

Conventionally, a printing apparatus that receives print data from a communication terminal via a network and forms an image on a sheet based on the received print data is known. There is also known generating print data to be transmitted to a printing apparatus using a printer driver (or a print application) designed to use each printing apparatus. Recently known is generating print data based on a standard specification without using the printer driver (or the print application) designed to use each printing apparatus. The specification of Internet Printing Protocol (IPP) that is the standard specification is disclosed, and various OSs incorporate a standard driver that generates print data in accordance with IPP.

Japanese Patent Laid-Open No. 2006-91987 describes that the hierarchical structure of a hierarchized setting menu is changed, thereby easily displaying a desire setting item.

SUMMARY OF THE INVENTION

The present invention provides an information processing apparatus capable of providing hierarchized user interface display, a control method, and a non-transitory computer-readable storage medium storing a program.

The present invention in one aspect provides a control method of an information processing apparatus implemented by an application that extends a function of print data generation software stored in the information processing apparatus, comprising: acquiring a medium type supported by a printing apparatus; identifying, based on the acquired medium type, a group to which the medium type belongs; identifying a display text corresponding to the medium type based on the acquired medium type; causing a display unit of the information processing apparatus to display the group in accordance with selection of an object for setting a medium type of a medium to be used for printing; and controlling to cause the display unit to display the display text based on selection of the group.

According to the present invention, it is possible to provide hierarchized user interface display.

Further features of the present invention will become apparent from the following description of exemplary embodiments with reference to the attached drawings.

BRIEF DESCRIPTION OF THE DRAWINGS

FIGS. 7A to 7F are views showing requests and responses in IPP communication;

FIGS. 8A to 8C are views showing message catalog files and a sheet setting command;

FIGS. 10A to 10C are views showing an IPP compatible database, a conversion table, and a display list;

DESCRIPTION OF THE EMBODIMENTS

Figure 1:
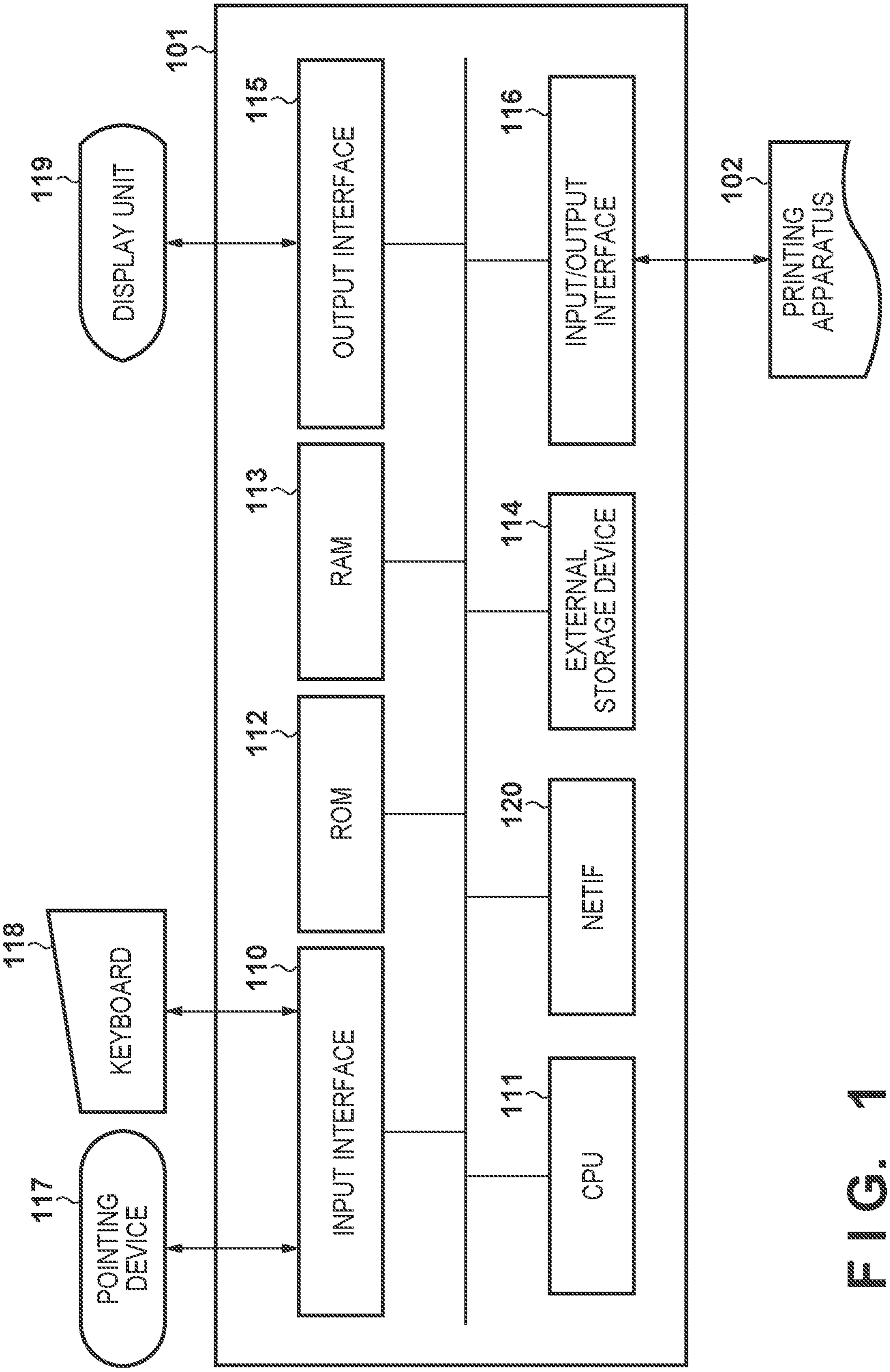
FIG. 1 is a view showing the hardware configuration of a print system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In a configuration that generates print data based on a standard specification, a hierarchized menu cannot be provided in some cases. Hence, in the configuration that generates print data based on a standard specification, it is demanded that a hierarchized user interface display can be provided.

According to the present disclosure, it is possible to provide a hierarchized user interface display.

First Embodiment

FIG. 1 is a block diagram showing the hardware configuration of a print system. In FIG. 1, a host computer 101 is an example of an information processing apparatus, and includes an input interface 110, a CPU 111, a ROM 112, a RAM 113, an external storage device 114, an output interface 115, and an input/output interface 116. An input device such as a keyboard 118 or a pointing device 117 is connected to the input interface 110. The keyboard 118 and the pointing device 117 can accept a user operation on, for example, a user interface screen, and will collectively be referred to as an operation unit hereinafter. A display device such as a display unit 119 is connected to the output interface 115. The display unit 119 can display a user interface screen according to this embodiment. The display unit 119 may be formed as a touch panel, and may be able to accept a user operation. A NETIF 120 is a network interface and performs control to transfer data to/from an external apparatus via a network.

The CPU 111 performs overall control of the host computer 101. The ROM 112 is a nonvolatile memory and stores, for example, an initialization program. The external storage device 114 stores an application program group, an Operating System (OS), print data generation software, and various kinds of data. The RAM 113 is a volatile memory and is used as a work memory when executing various kinds of programs stored in the external storage device 114, and the various kinds of programs can operate in the host computer 101.

Also, the external storage device 114 may store management software that manages medium information of a printing apparatus 102. By the management software, a user can register the medium information in the printing apparatus 102 or a printer driver. More specifically, for example, the management software downloads medium information supported by the printing apparatus 102 from a server (not shown) based on an instruction from the user and registers the medium information in the printing apparatus 102 or the printer driver. By the management software, the user can add new medium information to the printing apparatus 102, and also can cause the apparatus to display the new medium information on the setting screen of the printer driver such that it can be selected. Also, the user can customize the medium information downloaded from the server by the management software and register it as, for example, custom paper in the printing apparatus 102. In this case, the user can set a name on the management software. Note that the medium information include, for example, information such as a medium ID, a category, a thickness, an ink drying time, an ink use amount, a profile, and a calibration. In a case of custom paper, a name set by the user is also included. When registering medium information in the printing apparatus 102 by the management software, a medium setting command shown in FIG. 8C to be described later is transmitted to the printing apparatus 102.

Note that in this embodiment, the CPU 111 performs processing in accordance with the procedure of a program stored in the ROM 112, thereby executing processing according to a function (to be described later) in the host computer 101 and a flowchart (to be described later). The printing apparatus 102 that is a device is communicably connected to the host computer 101 via the input/output interface 116. Here, the host computer 101 and the printing apparatus 102 are separately formed. However, these may be formed as one information processing apparatus. Note that as the printing apparatus, an inkjet printer configured to perform printing by discharging ink onto a print surface will be described as an example. However, printing may be executed by another method (for example, an electrophotographic method). In addition, as the host computer 101, a desktop personal computer, a smartphone, or a laptop may be used. In a case where the host computer 101 and the printing apparatus 102 are connected via a network, the network can be any of a wired network, a wireless network, and a network including both. The network may include an apparatus different from the host computer 101 and the printing apparatus 102, for example, a router operating as an access point.

Figure 2:
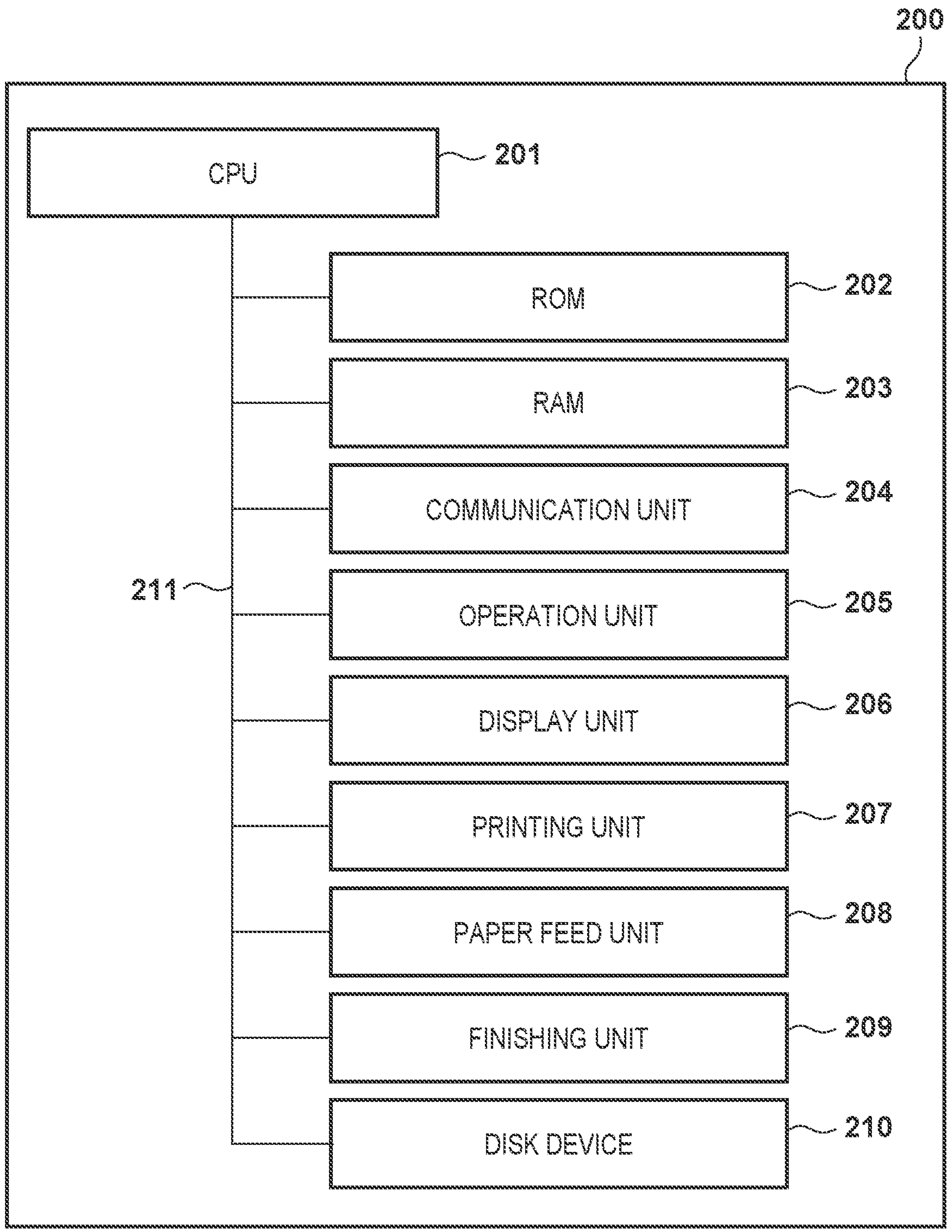
FIG. 2 is a view showing the hardware configuration of a printing apparatus.

FIG. 2 is a view showing the configuration of the printing apparatus 102. The printing apparatus 102 includes a CPU 201, a ROM 202, a RAM 203, a communication unit 204, an operation unit 205, a printing unit 207, a paper feed unit 208, a finishing unit 209, and a disk device 210. The ROM 202 is a nonvolatile memory and stores control programs and data. The RAM 203 is a volatile memory and is used as a work memory when executing various kinds of programs, and various kinds of programs can operate in the printing apparatus 102. Note that in this embodiment, the CPU 201 performs processing in accordance with the procedure of a program stored in the ROM 202, thereby executing processing in the printing apparatus 102.

The disk device 210 is a storage unit formed by, for example, a Hard Disk Drive (HDD) or a Solid State Drive (SSD), and stores programs and data. In this embodiment, the printing apparatus 102 includes a medium database in the disk device 210. The medium database is a database that stores medium information of a medium supported by the printing apparatus 102. The medium database is formed by medium information transmitted from the above-described management software in the host computer 101. For example, the medium database stores information included in a medium setting command shown in FIG. 8C to be described later. In other words, information included in the medium setting command shown in FIG. 8C is registration information to be registered in the medium database.

The communication unit 204 is a network interface and performs control to transfer data to/from an external apparatus via a network. The network can be any of a wired network, a wireless network, and a network including both. Also, the communication unit 204 can execute communication corresponding to the communication standard (Ethernet, WiFi®, or the like) of the network.

The operation unit 205 is configured to include, for example, a touch panel and a button, and can accept a user operation. The display unit 206 is a display device, and can display various kinds of user interface screens. For example, the display unit 206 can display the state of the printing apparatus 102. Note that the display unit 206 may be formed as a touch panel and configured to include the operation unit 205. The printing unit 207 includes a printhead that discharges ink droplets from nozzles, and an ink supply unit that supplies ink, and forms an image on a print medium (medium) such as a sheet fed from the paper feed unit 208. Note that a sheet will sometimes be described as an example of a print medium hereinafter.

The paper feed unit 208 can feed, for example, a cut sheet or a roll sheet, and feeds a sheet to the printing unit 207 based on an instruction from the CPU 201. The finishing unit 209 performs finishing processing (finishing) of a sheet printed by the printing unit 207. The finishing unit 209 includes, for example, a stapler that binds each copy using needles, a cutter that cuts a roll sheet at a designated position, a laminator that performs lamination processing for a sheet. For example, the finishing unit 209 may be configured to apply special transparent ink for the purpose of obtaining glossiness or improving weatherability. The processing of the finishing unit 209 is controlled by an instruction from the CPU 201. The disk device 210 is a mass storage device such as a hard disk or an SSD and stores print data transmitted from the host computer 101, and the like.

Figure 3:
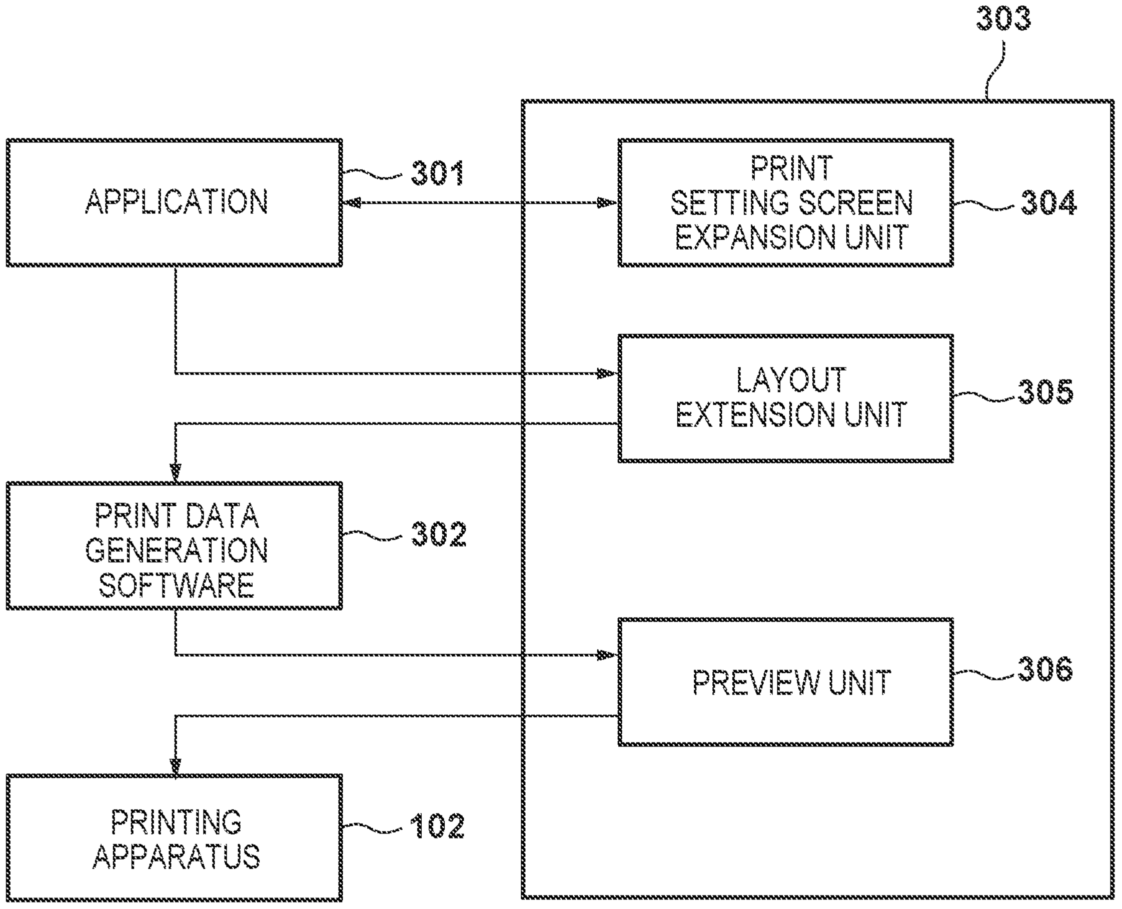
FIG. 3 is a view showing the software configuration in a host computer.

FIG. 3 is a view showing the software configuration in the host computer 101. Note that FIG. 3 shows a configuration in a case where an extension application 303 is associated with print data generation software 302. The print data generation software 302 is software included in the OS (not shown) of the host computer 101 in advance, and is, for example, Internet Printing Protocol (IPP) Class Driver that is a standard driver. That is, when the OS is installed in the host computer 101, the print data generation software 302 can be used. On the other hand, the extension application 303 is software that is not included in the OS in advance. For this reason, for example, the user operates the host computer 101, thereby downloading the extension application 303 from a server (not shown) via a network and installing it. Also, if the printing apparatus 102 is connected to the host computer 101, the CPU 111 acquires device identification information from the printing apparatus 102. Then, the CPU 111 may acquire the extension application 303 corresponding to the acquired device identification information from a server via a network and install it. That is, the print data generation software 302 and the extension application 303 are held as separate files in the host computer 101. Note that the print data generation software 302 and the extension application 303 are sometimes updated and upgraded, and the updating processing is performed at different timings. That is, the timing at which the print data generation software 302 is acquired by the host computer 101 and the timing at which the extension application 303 is acquired are different. Also, the trigger with which the print data generation software 302 is acquired by the host computer 101 and the trigger with which the extension application 303 is acquired are different. Note that if the extension application 303 is installed, the OS associates the print data generation software 302 with the extension application 303. The extension application 303 to be described in this embodiment includes a print setting screen extension unit 304, a layout extension unit 305, and a preview unit 306.

Note that every time processing of each unit is ended, the operation of the extension application 303 may be ended. In this case, every time a request to use each unit is received, the OS activates the extension application 303. Another form is also possible. For example, the OS may end the operation of the extension application 303 if processing of the print setting screen extension unit 304 is ended, but may keep the extension application 303 activated even if processing of the layout extension unit 305 is ended.

The layout extension unit 305 and the preview unit 306 will be described. The layout extension unit 305 performs layout processing based on intermediate data before processing by the print data generation software 302. The intermediate data is data generated based on a print instruction output from an application 301 such as a document creation application, and is, for example, data of the XML Paper Specification format (data of the XPS format). For example, the layout extension unit 305 provides a layout printing function (also called N-in-1 printing) of arranging a plurality of pages on a surface of one sheet and printing. The preview unit 306 can execute at least one of display and editing of print data generated by the print data generation software 302. Also, each unit of the extension application 303 can display a user interface screen (UI screen). However, the UI screen may not be displayed. For example, for the layout extension unit 305, only editing of intermediate data may be performed without displaying a UI screen, and the edited intermediate data may be output to the print data generation software 302. Note that if the layout extension unit 305 can display a UI screen, for example, a preview screen including a preview image and a setting area where print setting information is changed may be displayed based on intermediate data.

Processing from accepting a print instruction by the user to transmitting print data to the printing apparatus 102 will be described here.

The user instructs printing via the application 301. The application 301 is software that creates a content (drawing data) to be printed. For example, the application 301 is a document creation application or a spreadsheet application. The application 301 displays a print setting screen provided by the print setting screen extension unit 304. The print setting screen is, for example, a screen shown in FIGS. 5A to 5D to be described later. Upon accepting a print request from the user, the application 301 issues a print instruction to the OS. The print instruction includes print setting information for instructing operations of the print data generation software 302 and the printing apparatus 102. The print setting information is also called a Print Ticket (to be also referred to as a “PT” hereinafter). The user performs setting processing using a print setting screen provided by the print setting screen extension unit 304 provided by the extension application 303. By the setting processing, print setting information is generated.

Based on the print instruction, the OS generates intermediate data based on output data and the print setting information from the application 301, and activates the layout extension unit 305 of the extension application 303. Note that the output data from the application 301 is, for example, data of the Graphic Device Interface format (data of the GDI format) or data of the XML Paper Specification format (data of the XPS format). Drawing data corresponding to the content to be printed and the print setting information are included in the intermediate data. Note that the OS generates, for example, data of the XPS format as intermediate data based on data of the GDI format output from the application 301. If the application 301 outputs data of the XPS format as the output data, the OS may directly transfer the data of the XPS format to the layout extension unit 305. If the application 301 outputs data of the XPS format as the output data, the OS may generate data of the XPS format by correcting the data of the XPS format as the output data. Based on the drawing data included in the generated intermediate data and the print setting information generated by, for example, the screen shown in FIGS. 5A to 5D to be described later, the layout extension unit 305 edits the drawing data. The layout extension unit 305 outputs the edited drawing data to the print data generation software 302. Based on the print setting information generated based on print settings by the user and the drawing data after editing, the print data generation software 302 generates print data interpretable by the printing apparatus 102 and outputs the print data.

Next, the OS activates the preview unit 306 of the extension application 303. The preview unit 306 acquires print data generated by the print data generation software 302 and displays a print preview. The user confirms, on the print preview, that a desired printing result can be obtained, and then instructs to start printing using the UI screen of the print preview. Upon accepting the print start instruction from the user, the preview unit 306 outputs the print data. The print data output from the preview unit 306 is transmitted to the printing apparatus 102. The printing apparatus 102 performs printing on a medium based on the print data transmitted from the host computer 101.

With the above-described configuration, a layout function and a print preview function, which the print data generation software 302 does not have, can be implemented by the extension application 303. The configuration of the extension application 303 is not limited to that having all the above-described functions, and only some of the functions may be provided, or another function may be provided. Note that the extension application 303 is sometimes simply called print software. It can be said that the extension application 303 has at least one of a function of displaying a setting screen, a function of editing input data to the print data generation software 302, and a function of displaying print data, as described above.

Note that operations according to this embodiment to be described later will be described as operations in the extension application 303 using communication by a predetermined protocol, that is, IPP communication. However, some operations may be implemented by operations in a standard driver incorporated in the OS.

Figure 4:
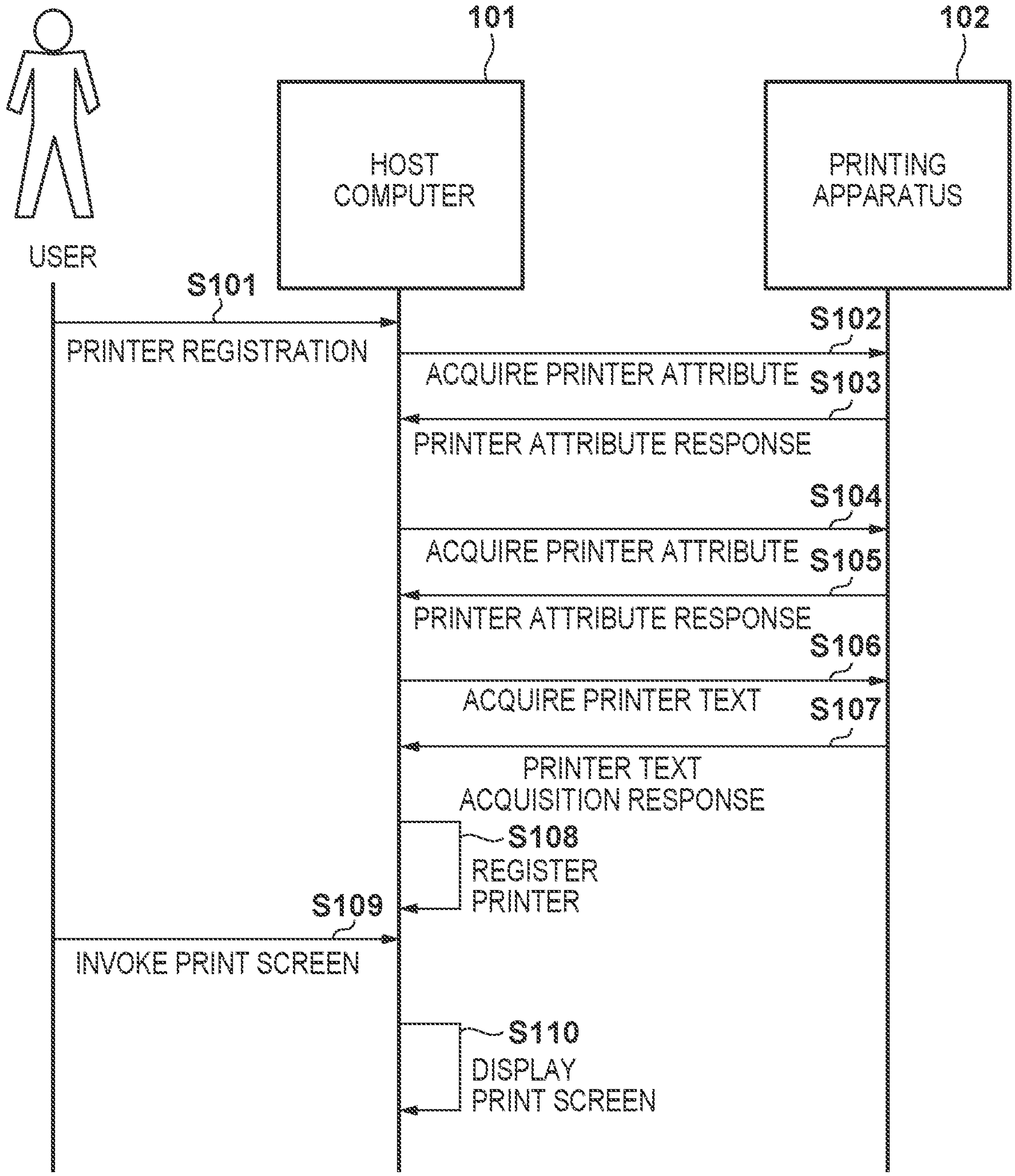
FIG. 4 is a sequence chart of IPP communication between the host computer and the printing apparatus.
Figure 12:
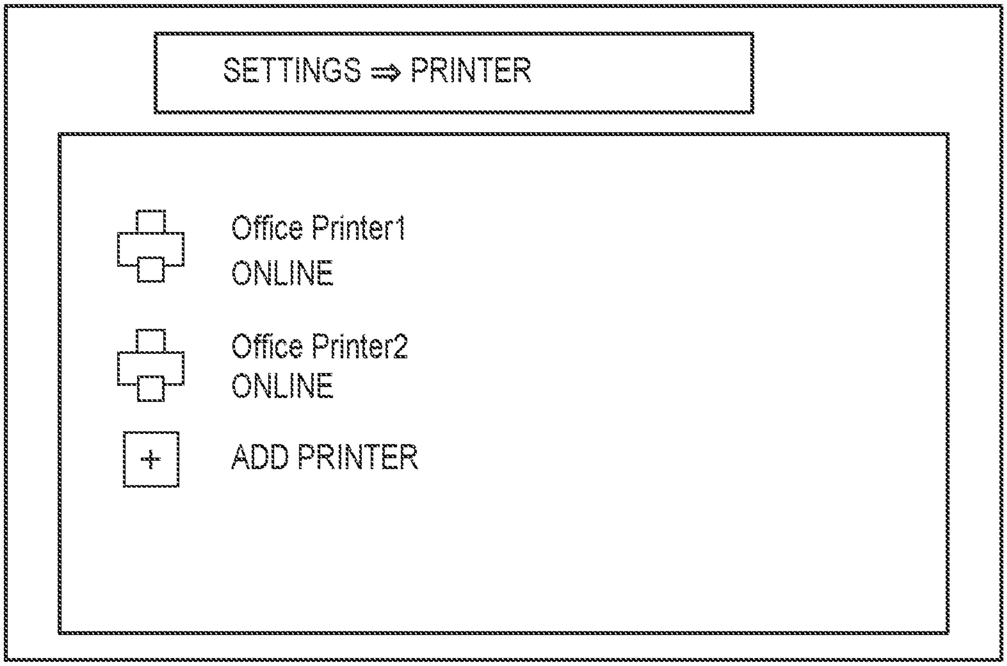
FIG. 12 is a view showing a user interface screen that accepts a printer registration instruction.

FIG. 4 is a sequence chart by IPP communication executed between the host computer 101 and the printing apparatus 102. In S101, the CPU 111 of the host computer 101 accepts a printer registration instruction via the operation unit. FIG. 12 is a view showing an example of a user interface screen that accepts a printer registration instruction. The screen shown in FIG. 12 is displayed when, for example, "printer" is selected from the setting menu of the OS of the information processing apparatus 101. On the screen shown in FIG. 12, a list of registered printer names is displayed together with icons representing the outer appearances of printers and state information. For example, FIG. 12 shows that Office Printer 1 and Office Printer 2 are already registered, and these are in an online state. A "+" button in FIG. 12 is a button that accepts an instruction for adding a printer. That is, acceptance of a printer registration instruction is done by, for example, accepting the "+" button on the screen shown in FIG. 12.

Upon accepting the printer registration instruction, in S102, the CPU 111 of the host computer 101 generates a printer attribute acquisition operation 701 shown in FIG. 7A and transmits it to the printing apparatus 102. Upon receiving the printer attribute acquisition operation 701, in S103, the CPU 201 of the printing apparatus 102 generates a printer attribute response 702 shown in FIG. 7B and transmits it to the host computer 101. The CPU 201 of the printing apparatus 102 refers to an IPP compatible database 1000 shown in FIG. 10A, and sets, in the printer attribute response 702, media-type attribute values of all media supported by the printing apparatus 102.

FIG. 10A shows the database structure of the IPP compatible database 1000. The IPP compatible database 1000 is generated by processing shown in FIG. 9 to be described later and held in the ROM 202, the RAM 203, or the disk device 210 of the printing apparatus 102. The following items are stored in the IPP compatible database 1000 in association with each other.

medium-specific ID (GUID)

Media-type attribute value used in IPP communication with the host computer 101

Flag representing whether the attribute value is a standard definition or a vendor definition Medium category Display text of the medium for the user interface Each of the Japanese terms that are arranged in a "JAPANESE" column (from "自動選択" to "その他ディスク") in FIGS. 10A and 10C means each of the English terms that are arranged in an "ENGLISH" column (from "Auto select" to "Printable disc (other)".

As will be described later with reference to FIG. 9, IPP compatible medium information is generated based on medium information in a medium database and stored in the IPP compatible database 1000. Thus, in this embodiment, the printing apparatus 102 holds the IPP compatible database in which each medium supported by the printing apparatus 102 is defined as an attribute value that can be designated in IPP communication.

FIG. 7A shows an example of the printer attribute acquisition operation 701 transmitted from the host computer 101 in S102. The printer attribute acquisition operation 701 is a printer attribute acquisition request, and requests the printing apparatus 102 to return the following printer attributes in IPP communication.

copies-supported document-format-supported media-supported media-type-supported media-source-supported printer-strings-languages-supported FIG. 7B shows an example of the printer attribute response 702 transmitted from the printing apparatus 102 in S103. The printer attribute response 702 is a response to the printer attribute acquisition request corresponding to the printer attribute acquisition operation 701, and indicates capability information of the printing apparatus 102. "Successful-ok" of a Status-Code attribute indicates that the acquisition request has normally succeeded. "1-999" of the copies-supported attribute indicates that 999 copies can be printed at maximum. The document-format-supported attribute indicates that documents in the PDF, JPEG, and PWG-Raster formats can be processed. The media-supported attribute indicates medium sizes feedable to the printing apparatus 102.

The media-type-supported attribute indicates the types of media supported by the printing apparatus 102. In FIG. 7B, auto (auto select), stationery (plain paper), and envelope (envelope) are standard definition keyword values defined in the standard PWG5101.1-2013-PWGMediaStandardizedNames2.0. Display texts used to display the standard definition keyword values are stored in the ROM 112 of the host computer 101 in advance. Values other than the standard definition keyword values are vendor definition attribute values. For example, in "com.example-photo-4065A3725632BC55BE16", the vendor definition attribute value is formed by "com.example" and "photo-4065A3725632BC55BE16". Here, "com.example" is DNS-Name, and "photo-4065A3725632BC55BE16" is Base-Name. Also, Base-Name is formed by "Photo" of a category part, and "4065A3725632BC55BE16". Note that "Photo" of the category part matches the above-described standard definition keyword value, and a display text therefor is stored in the ROM 112 of the host computer 101 in advance. That is, for the standard definition keyword values, the host computer 101 can acquire the display texts without a request to the printing apparatus 102. On the other hand, for the vendor definition attribute values, the host computer 101 acquires the display texts by requesting the printing apparatus 102.

The media-source-supported attribute indicates the types of feed ports provided in the printing apparatus 102. In this example, it is indicated that the printing apparatus 102 supports auto (auto), main (main feed port), tray-1 (first tray), and tray-2 (second tray).

The Printer-strings-languages-supported attribute indicates the types of languages of display texts supported by the printing apparatus 102. FIG. 7B shows that, for example, the printing apparatus 102 supports Japanese (ja) and English (en).

Note that not only FIGS. 7A and 7B but also FIGS. 7C to 7F to be described later are merely examples, and information other than information shown in the drawings may be included. Upon receiving the printer attribute response 702, the CPU 111 of the host computer 101 stores the printer attribute values included in the printer attribute response 702 in the RAM 113. In S104, the CPU 111 of the host computer 101 selects a language from the printer support languages included in the printer attribute, generates a printer attribute acquisition operation 703 shown in FIG. 7C, and transmits it to the printing apparatus 102. Selection of the language for display texts may be done, for example, based on the display language of the user interface screen designated by the user on the print setting screen. Here, assume that Japanese is selected.

FIG. 7C shows an example of the printer attribute acquisition operation 703 transmitted from the host computer 101 in S104. The printer attribute acquisition operation 703 is a printer attribute acquisition request, and requests the printing apparatus 102 to return a printer-strings-uri attribute value in IPP communication. "Attributes-natural-language-ja" in FIG. 7C means that the host computer 101 requests the address of a message catalog in Japanese.

Upon receiving the printer attribute acquisition operation 703, in S105, the CPU 201 of the printing apparatus 102 generates a printer attribute response 704 shown in FIG. 7D and transmits it to the host computer 101. The printer attribute response 704 sets a URL corresponding to the requested language (Japanese) as the printer-strings-uri attribute value.

FIG. 7D shows an example of the printer attribute response 704 transmitted from the printing apparatus 102 in S105. The printer attribute response 704 is a response corresponding to the printer attribute acquisition request corresponding to the printer attribute acquisition operation 703. "Successful-ok" of the status-code attribute in FIG. 7D indicates that the acquisition request has normally succeeded. "Printer-strings-uri=http://192.168.115.10/strings/ja.txt" indicates the address of a requested message catalog file in Japanese. Upon receiving the printer attribute response 704, in S106, the CPU 111 of the host computer 101 issues an HTTP GET method to the URL of the printer-strings-uri attribute value included in the printer attribute response 704. A display text to be displayed on the user interface screen can thus be acquired.

Upon receiving the HTTP GET method, the CPU 201 of the printing apparatus 102 generates a message catalog file 801 in Japanese shown in FIG. 8A. Then, in S107, the requested message catalog file 801 in Japanese is transmitted to the host computer 101.

The CPU 201 of the printing apparatus 102 refers to the IPP compatible database 1000 shown in FIG. 10A. For each "standard definition=FALSE" row, a character string "media-type" and the media-type attribute value of the corresponding medium are connected to form a left-hand side, a corresponding character string in Japanese is defined as the right-hand side, and these are connected by "=". For example, for the third row (category=photo, Japanese="光沢ゴールド") of the IPP compatible database 1000, information in the first row of the message catalog file 801 is acquired. The CPU 201 of the printing apparatus 102 repeats the above-described processing for all supported media, thereby generating the message catalog file 801 shown in FIG. 8A.

FIG. 8A is a view showing an example of the message catalog file 801. Each of the Japanese terms that are arranged in FIG. 8A (from "光沢ゴールド" to "その他ディスク") means each of the English terms that are arranged in FIG. 8B (from "Photo Paper Plus Glossy" to "Printable disc (other)" The left-hand side of "=" is defined as "attribute-name.keyword-value". For example, the first row defines that "com.example-photo-4065A3725632BC55BE16" keyword of the media-type attribute value is displayed as a text "光沢ゴールド" For the remaining rows as well, all the display texts (Japanese) of the vendor definition keywords included in the media-type-supported attribute of the printer attribute response 702 are defined by the message catalog file 801.

Note that if the IPP client side handles switching of a plurality of languages, S104 to S107 are repeated, thereby acquiring display texts in a plurality of different languages. For example, when selecting English as the language of display texts, the CPU 111 of the host computer 101 generates a printer attribute acquisition operation 705 shown in FIG. 7E in place of the printer attribute acquisition operation 703, and transmits it to the printing apparatus 102.

FIG. 7E shows an example of the printer attribute acquisition operation 705 transmitted from the host computer 101. Like the printer attribute acquisition operation 703, the printer attribute acquisition operation 705 is a printer attribute acquisition request, and requests the printing apparatus 102 to return a printer-strings-uri attribute value. "Attributes-natural-language-en" in FIG. 7E means that the host computer 101 requests the address of a message catalog in English.

The CPU 111 of the host computer 101 can acquire a printer attribute response 706 shown in FIG. 7F in which a URL corresponding to English is set as the printer-strings-uri attribute value.

FIG. 7F shows an example of the printer attribute response 706 transmitted from the printing apparatus 102. The printer attribute response 706 is a response corresponding to the printer attribute acquisition request corresponding to the printer attribute acquisition operation 705. "Successful-ok" of the status-code attribute in FIG. 7F indicates that the acquisition request has normally succeeded. "Printer-strings-uri=http://192.168.115.10/strings/en.txt" indicates the address of a requested message catalog file in English.

Upon receiving the printer attribute response 706, in S106, the CPU 111 of the host computer 101 issues an HTTP GET method to the URL of the printer-strings-uri attribute value included in the printer attribute response 706. A display text (English) can thus be acquired. Upon receiving the HTTP GET method, in S107, the CPU 201 of the printing apparatus 102 transmits a requested message catalog file 802 in English to the host computer 101.

FIG. 8B shows an example of the message catalog file 802 in English transmitted from the printing apparatus 102. The left-hand side of "=" is defined as "attribute-name.keyword-value". For example, the first row defines that "com.example-photo-4065A3725632BC55BE16" keyword of the media-type attribute is displayed as a text "photo paper plus glossy". For the remaining rows as well, all the display texts (English) of the vendor definition keywords included in the media-type-supported attribute of the printer attribute response 702 are defined by the message catalog file 802.

Upon receiving the message catalog file 801, the CPU 111 of the host computer 101 creates a printer queue in S108 and completes registration of the printer. Note that the same applies to a case where the message catalog file 802 is received.

In S109, the CPU 111 of the host computer 101 accepts a print setting screen invocation instruction from the user via the operation unit. In S110, the CPU 111 of the host computer 101 displays a print setting screen 500 shown in FIGS. 5A to 5D on the display unit 119 to accept a print instruction from the user.

FIGS. 5A to 5D are views showing a print setting screen displayed on the display unit 119 of the host computer 101 after acceptance of the print setting screen invocation instruction. The print setting screen 500 shown in FIGS. 5A to 5D is displayed by the CPU 111 of the host computer 101 rendering based on a program and data stored in the ROM 112 or the RAM 113. Also, the print setting screen 500 is provided by, for example, the print setting screen extension unit 304 shown in FIG. 3.

Figure 5A:
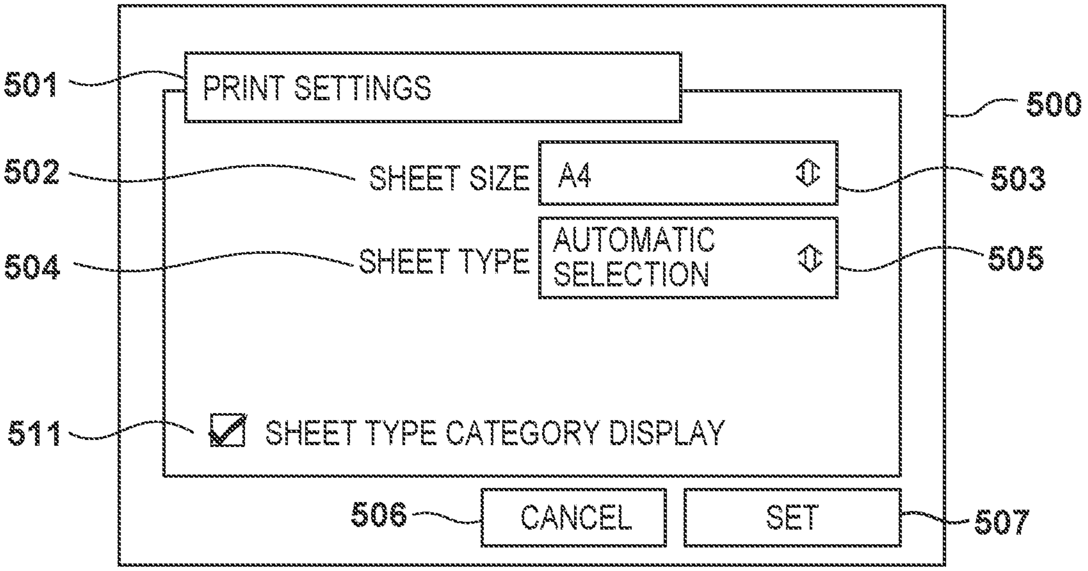
FIGS. 5A to 5D are views showing a print setting screen.

FIG. 5A shows the initial screen of the print setting screen 500. By a setting display switching menu 501, the user can switch the setting to the displayed on the screen not only to print settings but also to advanced settings, maintenance, or the like. An item 502 is an item configured to accept selection of a medium size. By selecting a medium size in a drop-down menu 503, the user can change the medium size to an arbitrary medium size supported by the printer, including the initial value "A4". Medium sizes selectable in the drop-down menu 503 are decided based on the media-supported attribute included in the printer attribute response 702.

An item 504 is an item configured to accept a medium type setting. By selecting a medium type in a drop-down menu 505, the user can change the medium type. Medium types selectable in the drop-down menu 505 are decided based on the media-type-supported attribute included in the printer attribute response 702.

If the user presses a cancel button 506, the issue of a print job is stopped. A decision button 507 is a print start button, and if the user presses this, the CPU 111 of the host computer 101 determines that a print start instruction is received, and starts printing.

A check box 511 is a check box configured to accept selection concerning whether to do category display. If the check box 511 is ON, the CPU 111 of the host computer 101 controls to do category display to be described later. If the check box 511 is OFF, control is performed not to do category display. The CPU 111 of the host computer 101 stores, in the RAM 113, the ON/OFF information of the check box 511.

The screens shown in FIG. 5A and FIGS. 5B to 5D to be described later may include other information. For example, a drop-down menu in which the user can change the feed port may be displayed. In this case, feed ports selectable in the drop-down menu are decided based on the media-source-supported attribute value included in the printer attribute response 702.

Figure 5B:
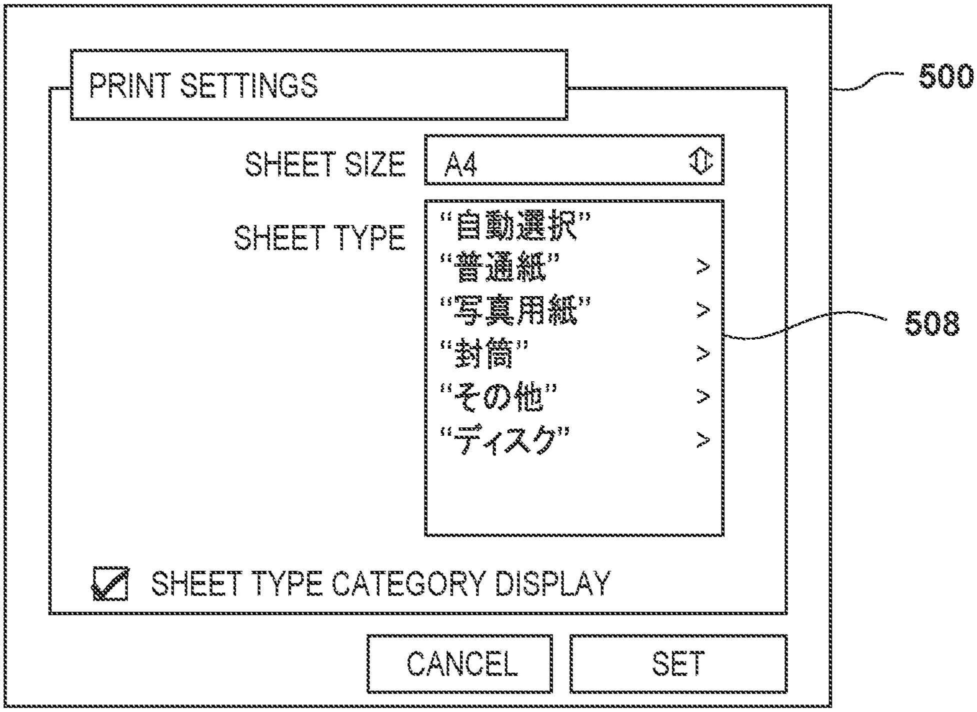

FIG. 5B shows a drop-down menu screen when performing category display on the display unit 119 of the host computer 101. The Japanese term "自動選択" in FIGS. 5B to 5D means the English term "Auto select". The Japanese term "普通紙" in FIGS. 5B to 5D means the English term "Plain Paper". The Japanese term "写真用紙" in FIGS. 5B to 5D means the English term "Photo Paper". The Japanese term "封筒" in FIGS. 5B to 5D means the English term "envelope". The Japanese term "その他" in FIGS. 5B to 5D means the English term "other". The Japanese term "ディスク" in FIGS. 5B to 5D means the English term "disc". The Japanese term "光沢ゴールド" in FIGS. 5C to 5D means the English term "Photo Paper Plus Glossy". The Japanese term "光沢プラチナ" in FIGS. 5C to 5D means the English term "Photo Paper Pro Platinum". The Japanese term "マットフォト用紙" in FIGS. 5C to 5D means the English term "Matte Photo Paper". The Japanese term "アート紙" in FIG. 5D means the English term "Fine Art Paper". The Japanese term "和紙" in FIG. 5D means the English term "Washi (Japanese Paper)". The Japanese term "推奨ディスク" in FIG. 5D means the English term "Printable disc (recommended)". The Japanese term "その他ディスク" in FIG. 5D means the English term "Printable disc (other)". If the check box 511 is ON, display texts of options "自動選択", "普通紙", "写真用紙", "封筒", "その他", and "ディスク" are displayed in a drop-down menu 508. A ">" mark is displayed for each option except auto select, thereby indicating that a lower layer exists. This hierarchy display is performed based on a display list 1002 shown in FIG. 10C. That is, corresponding display texts in Japanese are displayed for overlapping contents in the field of category of the display list 1002, that is, in the order of "stationery", "photo", "envelope", "other", and "disc". However, for "auto", category display is not performed as an exception, and a display text "自動選択" is displayed. The display list 1002 will be described later.

Figure 5C:
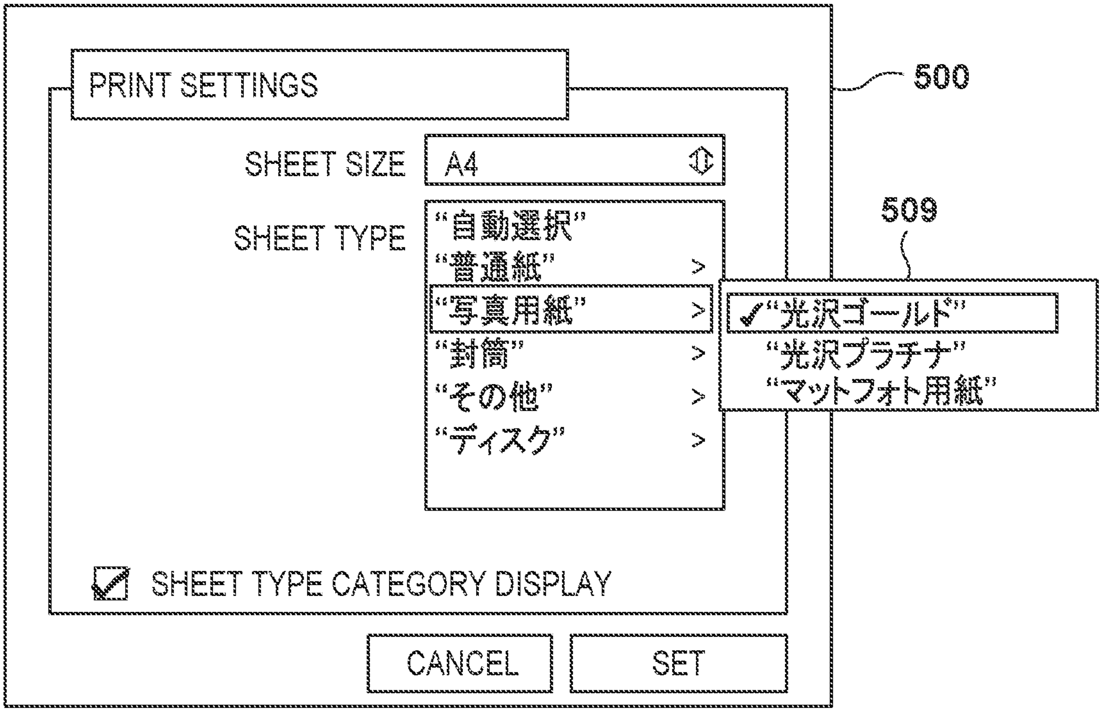

FIG. 5C shows a screen indicating a state in which "photo" is selected from the category-displayed drop-down menu. A medium type selection area 509 is displayed next to the category "写真用紙", and display texts "光沢ゴールド", "光沢プラチナ", and "マットフォト用紙" are displayed in the area. These correspond to display texts (Japanese) "光沢ゴールド", "光沢プラチナ", and "マットフォト用紙" corresponding to the category "photo" in the display list 1002 shown in FIG. 10C. That is, the display shown in FIG. 5C is done based on the display list 1002, and the Japanese display texts for media having the category value "photo" are displayed in order.

In this embodiment, display is done as shown in FIG. 5C, thereby displaying, for example, that the above-described three types of media exist in the category "photo". Also, since the number of medium types displayed at once is suppressed, convenience in user selection can be improved.

Figure 5D:
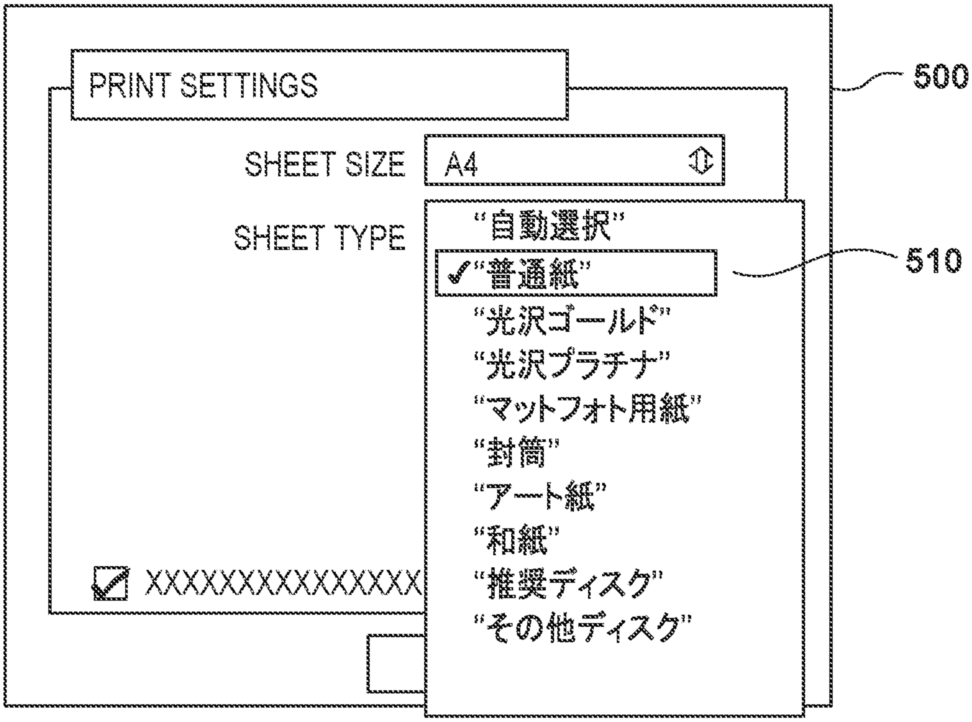

FIG. 5D shows a screen of a drop-down menu in a case where category display is not performed. If the check box 511 is OFF, all medium types supported by the printing apparatus 102 are displayed in a drop-down menu 510. Here, "自動選択", "普通紙", "光沢ゴールド", "光沢プラチナ", "マットフォト用紙", "封筒", "アート紙", "和紙", "推奨ディスク", and "その他ディスク" are displayed. The display shown in FIG. 5D is done based on the display list 1002, and the Japanese display texts for all media included in the display list 1002 are displayed in order.

Figure 6:
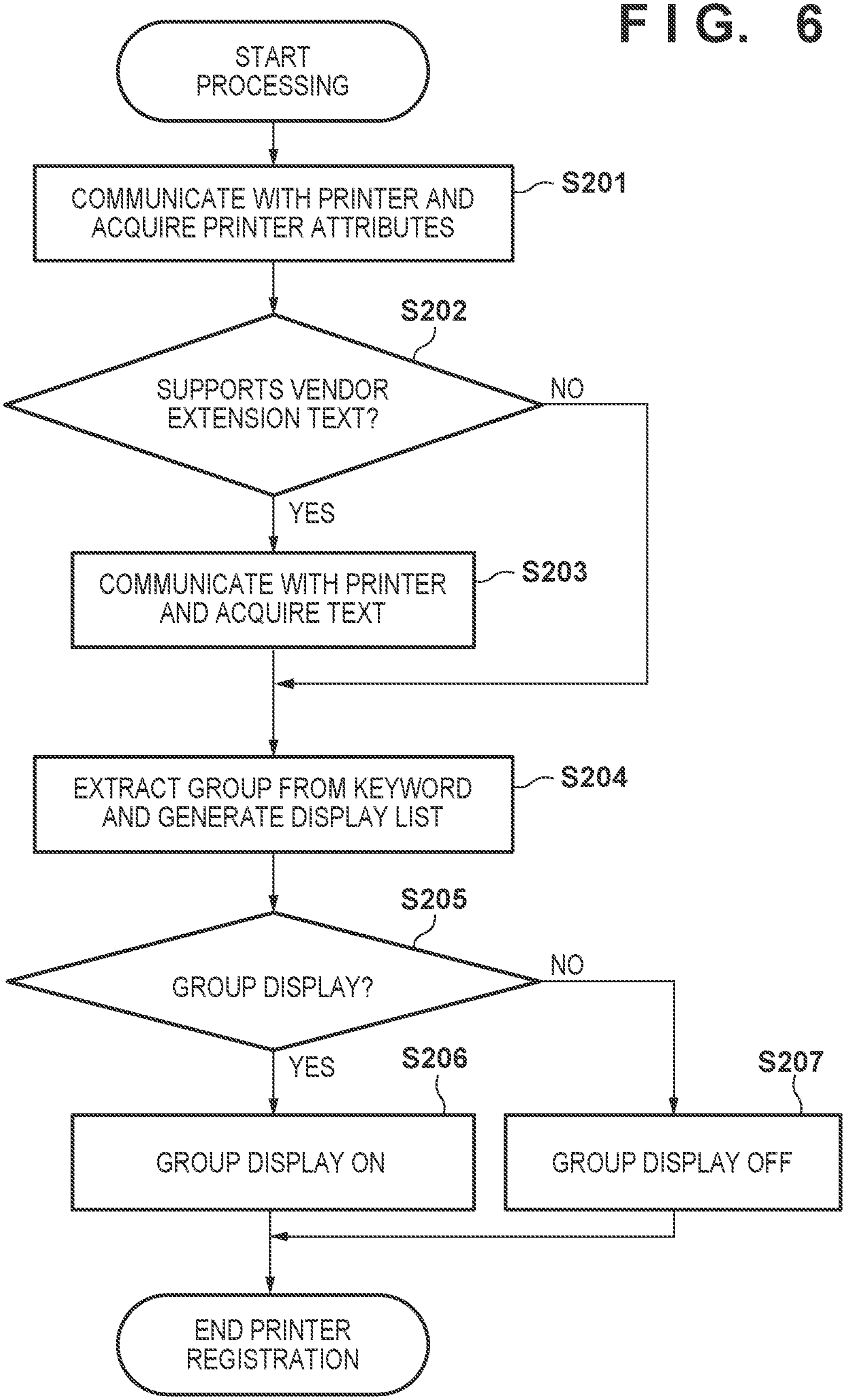
FIG. 6 is a flowchart showing processing in the host computer.

FIG. 6 is a flowchart showing processing in the host computer 101 in S102 to S108 and S110 in FIG. 4. The processing shown in FIG. 6 is implemented by, for example, the CPU 111 of the host computer 101 reading out the program of the print setting screen extension unit 304 or data stored in the ROM 112 or the RAM 113 and executing it. The processing shown in FIG. 6 is started when printer registration in S101 is instructed from the user via the operation unit.

In step S201, the CPU 111 transmits the printer attribute acquisition operation 701 to the printing apparatus 102, thereby acquiring the printer attribute response 702. The CPU 111 stores, in the RAM 113, the media-type attribute values of all media supported by the printing apparatus 102 and set in the printer attribute response 702. Note that step S201 corresponds to S102 and S103 in FIG. 4.

In step S202, the CPU 111 determines whether the printer attribute response 702 supports display of vendor definition display texts. More specifically, for example, if a printer-strings-languages-supported attribute value exists in the printer attribute response 702, and a valid value is included, the CPU 111 determines that the printer attribute response 702 supports display of vendor definition display texts. If it is determined that the printer attribute response 702 supports display of vendor definition display texts, the process advances to step S203. On the other hand, if it is determined that the printer attribute response 702 does not support display of vendor definition display texts, the process advances to step S204.

In step S203, the CPU 111 communicates with the printing apparatus 102, thereby acquiring a URL in the language selected by the host computer 101. The CPU 111 accesses the URL, thereby acquiring a message catalog file in which display texts are described. For example, to support Japanese and English, first, the CPU 111 generates the request 703 for acquiring a message catalog file in Japanese and transmits it to the printing apparatus 102. In the request 703, attributes-natural-language-ja and requested-attributes=printer-strings-uri are set. The CPU 111 receives the response 704 to the request 703, thereby acquiring a URL corresponding to Japanese, in this example, http://192.168.115.10/strings/ja.txt. The CPU 111 accesses the URL, thereby acquiring the message catalog file 801 in Japanese. Next, the CPU 111 generates the request 705 for acquiring a message catalog file in English and transmits it to the printing apparatus 102. In the request 705, attributes-natural-language=en and requested-attributes=printer-strings-uri are set. The CPU 111 receives the response 706 to the request 705, thereby acquiring a URL corresponding to English, that is, http://192.168.115.10/strings/en.txt. The CPU 111 accesses the URL, thereby acquiring the message catalog file 802 in English.

If acquisition of message catalog files in all languages selected by the host computer 101 is ended, the process advances to step S204.

In step S204, the CPU 111 generates the display list 1002 in the following way. The CPU 111 determines, for each keyword of the media-type-supported attribute value acquired in step S201, whether the keyword matches a known standard definition keyword value. For example, "auto", "stationery", "photographic", "disc", and the like are known as known standard definition keyword values. Upon determining that the keyword matches the standard definition keyword value, the CPU 111 sets a standard definition flag to "TRUE", and sets the category to the keyword value itself. For example, if the media-type-supported attribute value acquired in step S201 is "Stationery", the CPU 111 determines that it matches a known standard definition keyword value. Then, the CPU 111 sets the standard definition flag to "True", and sets the category to "Stationery" that is the keyword value. For "auto" that means automatic selection, no category is set as an exception. The CPU 111 then acquires a display text for each language concerning the standard definition keyword value from a known database stored in the ROM 112 or the RAM 113 in advance.

On the other hand, if it is determined that the keyword does not match the known standard definition keyword value, it may be a vendor definition keyword. Hence, the keyword value is divided by a hyphen "-" into DNS-Name and Base-Name. For example, if the media-type-supported attribute value acquired in step S201 is "com.example-photo-4065A3725632BC55BE16", the CPU 111 divides the attribute value. That is, the CPU 111 divides the attribute value into "com.example" that is DNS-Name and "photo-4065A3725632BC55BE16" that is Base-Name. Also, if "-" is included in Base-Name, the CPU 111 further divides it into a category "photo" and an identifier "4065A3725632BC55BE16". A Japanese display text corresponding to the attribute value is recorded in the message catalog file 801 acquired in step S203.

If the media-type attribute value is "com.example-photo-4065A3725632BC55BE16", a text to be displayed is defined in a row with "media-type.com.example-photo-4065A3725632BC55BE16" in the message catalog file 801. In this example, the text is "光沢ゴールド". Since the category "photo" is a standard definition keyword value, a display text for each language is acquired from a known database stored in the ROM 112 or the RAM 113 in advance. Then, the CPU 111 generates information in which the media-type-supported attribute value, the flag representing whether it is a standard definition, the category, and the display text are associated with each other. This processing is repeated for each media-type-supported attribute value, thereby generating the display list 1002. Note that although the display texts are defined for both Japanese and English in the display list 1002, display texts in only one of the languages may be defined.

In step S205, the CPU 111 determines whether to perform category display of media. For example, if the check box 511 is ON, the CPU 111 determines to perform category display and advances to step S206. If the check box 511 is OFF, the CPU 111 determines not to perform category display and advances to step S207. If an error occurs in step S204 in which the display list 1002 is generated, it may be determined not to perform category display.

Figure 11:
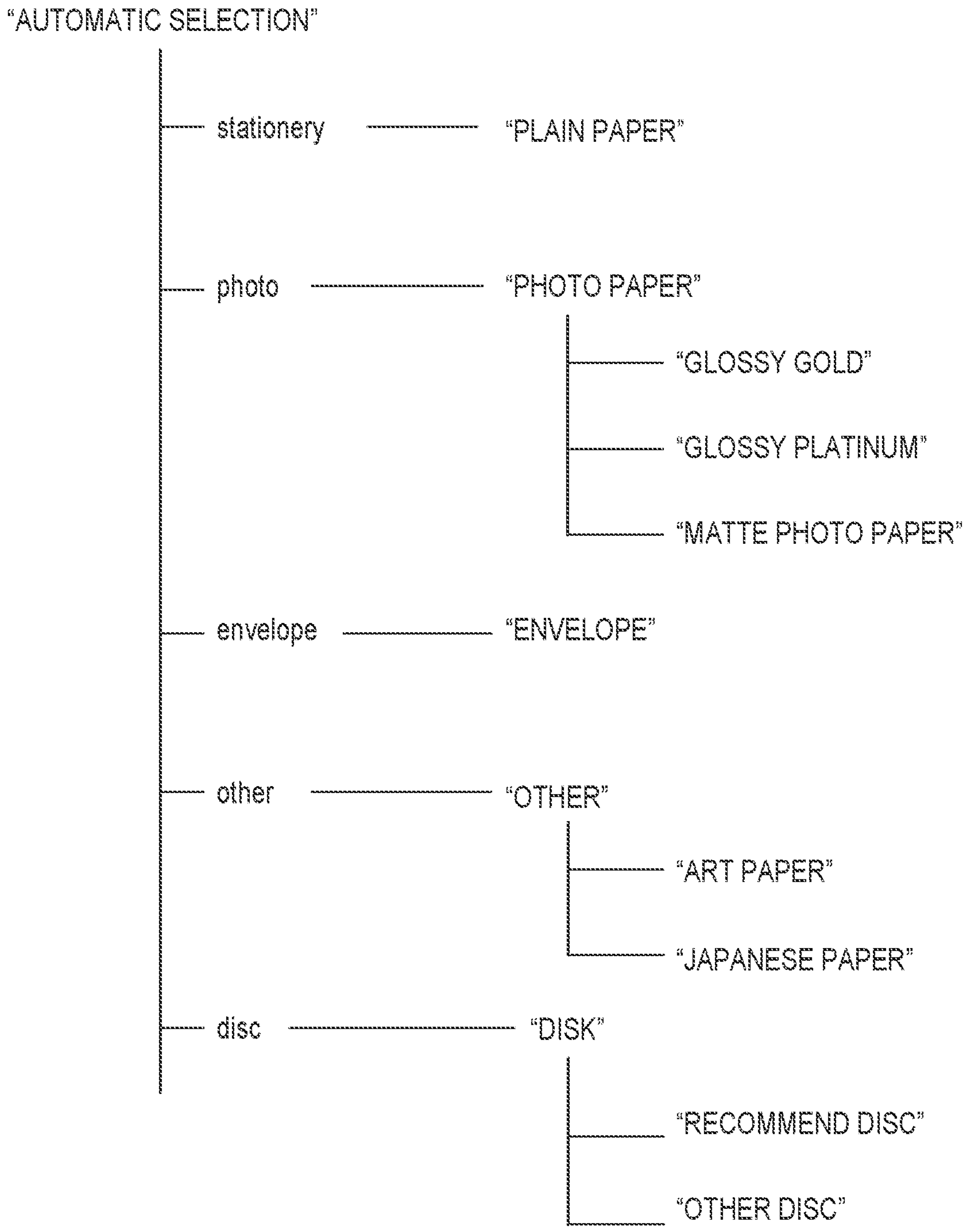
FIG. 11 is a view showing a data structure.

In step S206, the CPU 111 generates GUI display data based on the display list 1002 generated in step S204. First, the CPU 111 generates the hierarchical structure of data of display texts based on the display list 1002. FIG. 11 shows a hierarchical structure generated based on the display list 1002. Note that FIG. 11 shows a case where the host computer 101 selects Japanese from printer support languages acquired by the printer attribute response 702. As shown in FIG. 11, in a case of the display list 1002, a two-layered hierarchical structure is generated in which display texts of vendor definition attribute values are located in the lower layer (child element) of display texts (standard definition keyword values) of the category of an upper layer (parent element). Then, based on the generated hierarchical structure, the CPU 111 generates GUI display data that can hierarchically be displayed. For example, as the GUI display data that can hierarchically be displayed, display data for displaying the drop-down menu 508 shown in FIG. 5B is generated. Note that the order of display texts of a category in the hierarchical structure may be, for example, the appearance order of media_type_supported attribute values acquired in S103 of FIG. 4. Alternatively, the order may be based on an order predetermined in a database storing the display texts of the standard definition keyword values, which the host computer 101 holds in the ROM 112. After step S206, the processing shown in FIG. 6 is ended.

On the other hand, if it is determined, in step S205, not to perform category display, the process advances to step S207 to generate GUI display data based on the display list 1002 generated in step S204. For example, if the host computer 101 selects Japanese from printer support languages acquired by the printer attribute response 702, the CPU 111 displays a list of Japanese display texts in the display list 1002. For example, display data for displaying the drop-down menu 510 shown in FIG. 5D is generated. The order of display texts at that time may be, for example, the appearance order of media_type_supported attribute values acquired in S103 of FIG. 4, or may be an alphabetical order. After step S207, the processing shown in FIG. 6 is ended.

Processing of generating the IPP compatible database 1000 in the printing apparatus 102 will be described next with reference to FIG. 9.

Figure 9:
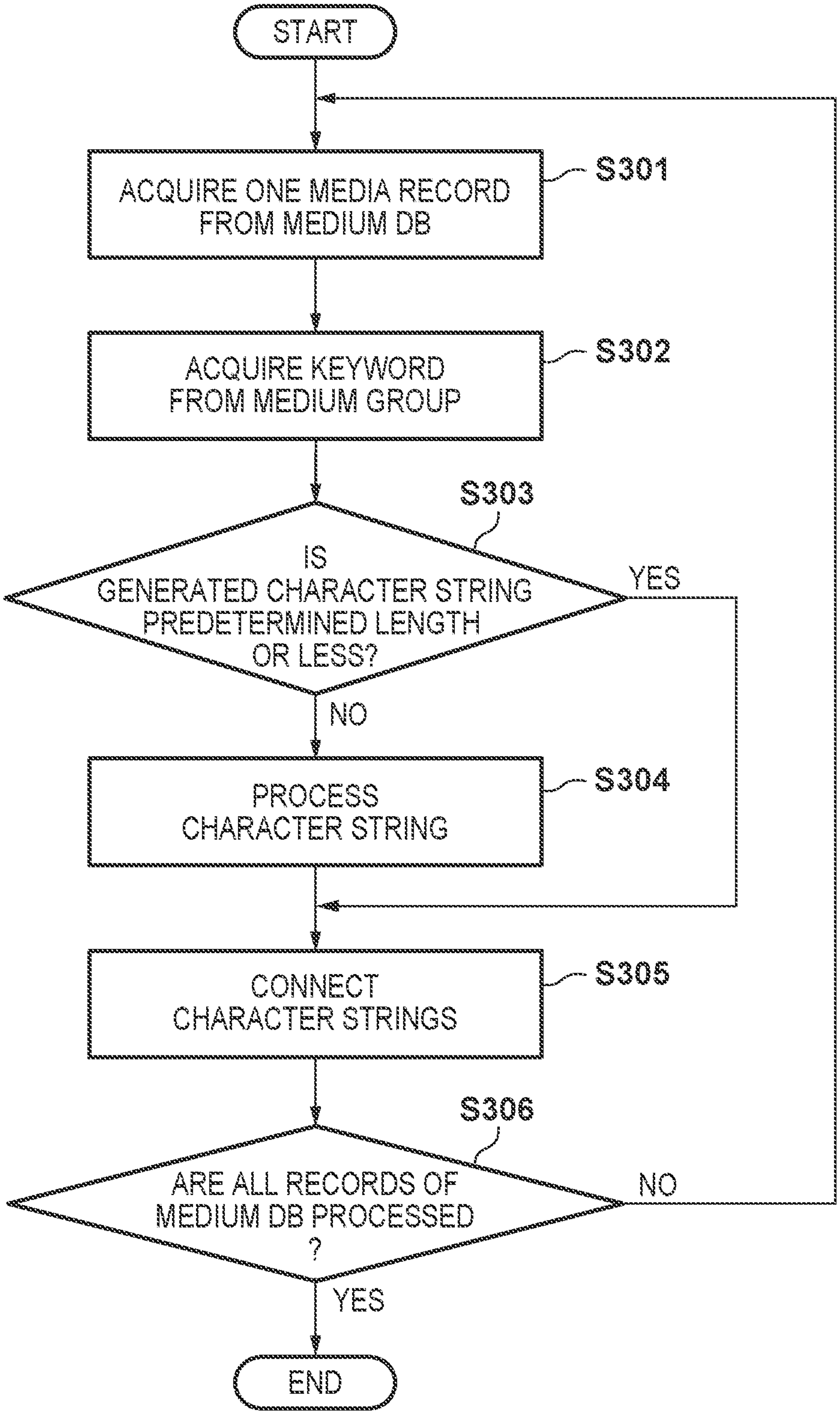
FIG. 9 is a flowchart showing processing in the printing apparatus.

FIG. 9 is a flowchart showing processing of generating the IPP compatible database 1000 in the printing apparatus 102. The processing shown in FIG. 9 is implemented by, for example, the CPU 201 of the printing apparatus 102 reading out a program or data stored in the ROM 202 or the RAM 203 and executing it. The processing shown in FIG. 9 is started when the CPU 201 receives a medium setting command 803 from the host computer 101 via the communication unit 204.

FIG. 8C is a view showing an example of the medium setting command 803 that the CPU 111 of the host computer 101 transmits to the printing apparatus 102. FIG. 8C shows an example of a medium setting command that adds one type of medium such that printing thereon can be performed.

"Add-media" in the first row indicates a medium type addition instruction. "Mediagroup=0" in the second row indicates that the medium group belongs to 0 (plain paper). The third row indicates a medium-specific ID that is shown as, for example, a random 128-bit value. The fourth row indicates a display name to be displayed on a user interface screen. From the fifth row, parameters to be referred to at the time of printing are set and, for example, a lookup table for color processing is shown. The above-described information may be defined based on the setting contents on the setting screen of the management software of the host computer 101 or medium information acquired from the server by the management software.

Upon receiving the medium setting command 803 from the host computer 101, the CPU 201 of the printing apparatus 102 stores it in a medium database stored in the ROM 202. Then, as will be described later, for the IPP compatible database 1000, the CPU 201 of the printing apparatus 102 generates an attribute value that can be designated in IPP communication based on the medium information designated by the medium setting command 803 and adds the attribute value to the IPP compatible database 1000.

In step S301, the CPU 201 acquires one record of data from a medium database stored in the ROM 202. One record includes a medium group, a medium-specific ID, a name, and a print parameter as shown in FIG. 8C.

In step S302, the CPU 201 acquires a standard definition keyword value used in IPP communication from the medium group. The medium group is recorded as, for example, one of numerical values of 0 to 5. The CPU 201 refers to a conversion table 1001 shown in FIG. 10B and acquires a standard definition keyword value of IPP corresponding to the numerical value.

FIG. 10B is a view showing an example of the conversion table 1001, and a medium group and a standard definition keyword value (category) used in IPP communication to which the medium group belongs are associated with each other. The conversion table 1001 is held in the ROM 202, the RAM 203, or the disk device 210 of the printing apparatus 102. For example, if the medium group is 0, it is converted into "stationery". A medium group "1" is converted into "photographic", "2" is converted into "envelope, "3" is converted into "disc", "4" is converted into "film", and "5" is converted into "other". The converted standard definition keyword value of IPP is defined as the category.

In step S303, the CPU 201 determines whether the length of a character string formed by connecting the DNS name "com.example" representing the vendor definition, the category keyword (standard definition keyword value), and the medium ID by hyphens "-" is a predetermined length or less. In this embodiment, it is determined whether, for example, the length is equal to or less than a predetermined length corresponding to 38 to 40 characters. If it is determined that the length of the character string is the predetermined length or less, the process advances to step S304. If it is determined that the length of the character string is not the predetermined length or less, the process advances to step S305. It is determined whether the length of the character string is the predetermined length or less because the processible keyword length is limited depending on the specifications of the host computer 101 in some cases. For example, if the keyword is long, a fault occurs in processing. Hence, such a fault can be avoided by setting the length of the keyword to the predetermined length or less.

In step S304, the CPU 201 performs processing to make the medium-specific ID short such that the length of the character string formed by connecting the DNS name "com.example" representing the vendor definition, the category keyword, and the medium-specific ID by hyphens "-" is a predetermined length or less. For example, the hyphen of the medium-specific ID is removed to remove characters from the right end such that the length does not exceed the predetermined length.

In step S305, the CPU 201 connects the DNS name "com.example" representing the vendor definition, the category keyword, and the medium-specific ID by hyphens "-", and writes the character string as a record in the IPP compatible database 1000.

In step S306, the CPU 201 determines whether all the records in the medium database are processed. If it is determined that not all the records are processed, the processing from step S301 is repeated. On the other hand, if it is determined that all the records are processed, the processing shown in FIG. 9 is ended.

As described above, according to this embodiment, a hierarchized menu can be displayed in a print system using IPP communication. As a result, the user can easily select a target medium type and improve convenience.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-023636, filed Feb. 17, 2023, which is hereby incorporated by reference herein in [their] its entirety.

What is claimed is:

1. A control method of an information processing apparatus implemented by an application that extends a function of print data generation software stored in the information processing apparatus, comprising:

acquiring a medium type supported by a printing apparatus;

identifying, based on the acquired medium type, a group to which the acquired medium type belongs;

identifying a display text corresponding to the acquired medium type;

causing a display unit of the information processing apparatus to display groups as first selectable options including the group to which the acquired medium type belongs, in accordance with selection of an object for setting a medium type of a medium to be used for printing; and in accordance with selection of the group to which the acquired medium type belongs is selected, controlling to cause the display unit to display medium types included in the group to which the acquired medium type belongs as second selectable options including the display text corresponding to the acquired medium type.

2. The method according to claim 1, wherein the group to which the acquired medium type belongs is identified based on some pieces of information included in the acquired medium type.

3. The method according to claim 1, wherein the display text is acquired from the printing apparatus.

4. The method according to claim 1, wherein whether to display the first selectable options is controlled in accordance with a setting by a user.

5. The method according to claim 1, wherein acquisition of the medium type is performed by communication using a predetermined protocol.

6. The method according to claim 5, wherein the predetermined protocol is Internet Printing Protocol (IPP).

7. The method according to claim 6, wherein the medium type is a media-type attribute value of the IPP.

8. The method according to claim 1, wherein the print data generation software is software provided by an operating system of the information processing apparatus.

9. The method according to claim 1, wherein in a case where the group to which the acquired medium type belongs is selected, medium types included in other groups different from the group to which the acquired medium type belongs are not displayed.

10. The method according to claim 1, wherein the acquired medium type corresponds to a medium added in the printing apparatus.

11. A non-transitory computer-readable storage medium storing a control method of an information processing apparatus that stores print data generation software, the control method comprising:

acquiring a medium type supported by a printing apparatus;

identifying, based on the acquired medium type, a group to which the acquired medium type belongs;

identifying a display text corresponding to the acquired medium type;

causing a display unit of the information processing apparatus to display groups as first selectable options including the group to which the acquired medium type belongs, in accordance with selection of an object for setting a medium type of a medium to be used for printing; and in accordance with selection of the group to which the acquired medium type belongs is selected, controlling to cause the display unit to display medium types included in the group to which the acquired medium type belongs as second selectable options including the display text corresponding to the acquired medium type.

12. An information processing apparatus that stores print data generation software, comprising:

at least one memory and at least one processor which function as:

an acquisition unit configured to acquire a medium type supported by a printing apparatus;

a identifying unit configured to identify, based on the acquired medium type, a group to which the acquired medium type belongs, and a display text; and a control unit configured to control to cause a display unit of the information processing apparatus to display groups as first selectable options including the group to which the acquired medium type belongs, in accordance with selection of an object for setting a medium type of a medium to be used for printing, and in accordance with selection of the group to which the acquired medium type belongs is selected, cause the display unit to display medium types included in the group to which the acquired medium type belongs as second selectable options including the display text corresponding to the acquired medium type.

* * * * *